United States Patent [19]

Suman et al.

[11] Patent Number: 5,070,434
[45] Date of Patent: Dec. 3, 1991

[54] OVERHEAD LIGHT

[75] Inventors: Michael J. Suman; Jonathan A. Dykstra, both of Holland, Mich.

[73] Assignee: Prince Corporation, Holland, Mich.

[21] Appl. No.: 594,064

[22] Filed: Oct. 9, 1990

[51] Int. Cl.⁵ .............................................. B60Q 3/02
[52] U.S. Cl. ........................................ 362/74; 362/61
[58] Field of Search ................ 296/37.7, 215; 362/61, 362/74, 80, 83.3

[56] References Cited

U.S. PATENT DOCUMENTS

| | | |
|---|---|---|
| 2,228,642 | 1/1941 | Robertson . |
| 2,748,261 | 10/1951 | Wolar . |
| 2,999,150 | 9/1961 | Kallel ................... 362/74 |
| 3,185,837 | 5/1965 | Stern ................... 362/371 |
| 3,643,086 | 2/1972 | Shaw ................... 240/41.6 |
| 3,912,918 | 10/1975 | Feinbloom ................ 362/32 |
| 4,142,227 | 2/1979 | Aikens ................... 362/74 |
| 4,232,361 | 11/1980 | Kelsall .................. 362/364 |
| 4,258,413 | 3/1981 | Mausser ................. 362/287 |
| 4,298,912 | 11/1981 | Dearth ................... 362/74 |
| 4,499,528 | 2/1985 | Hawlitzki ................ 362/61 |
| 4,760,500 | 7/1988 | Peng .................... 362/61 |
| 4,818,010 | 4/1989 | Dillon .................. 296/37.7 |
| 4,867,498 | 9/1989 | Delphia et al. ........... 296/37.7 |

Primary Examiner—Ira S. Lazarus
Assistant Examiner—Sue Hagarman
Attorney, Agent, or Firm—Price, Heneveld, Cooper DeWitt & Litton

[57] ABSTRACT

A directional courtesy light for a vehicle includes a reflector which is moveable with respect to a bulb between a first position for providing unfocused light to a second position for providing focused light. In the second position, the reflector can be tilted to direct the focused light in a specific direction. The courtesy light may include a lens to further control the light. The reflector is mounted to a bulb holder for translation with respect to a bulb therein and the bulb holder is mounted to a carrier attached to the vehicle for pivoting the holder with respect to the carrier. The courtesy light components snap together and snaps in place in the vehicle for quick assembly and installation.

20 Claims, 2 Drawing Sheets

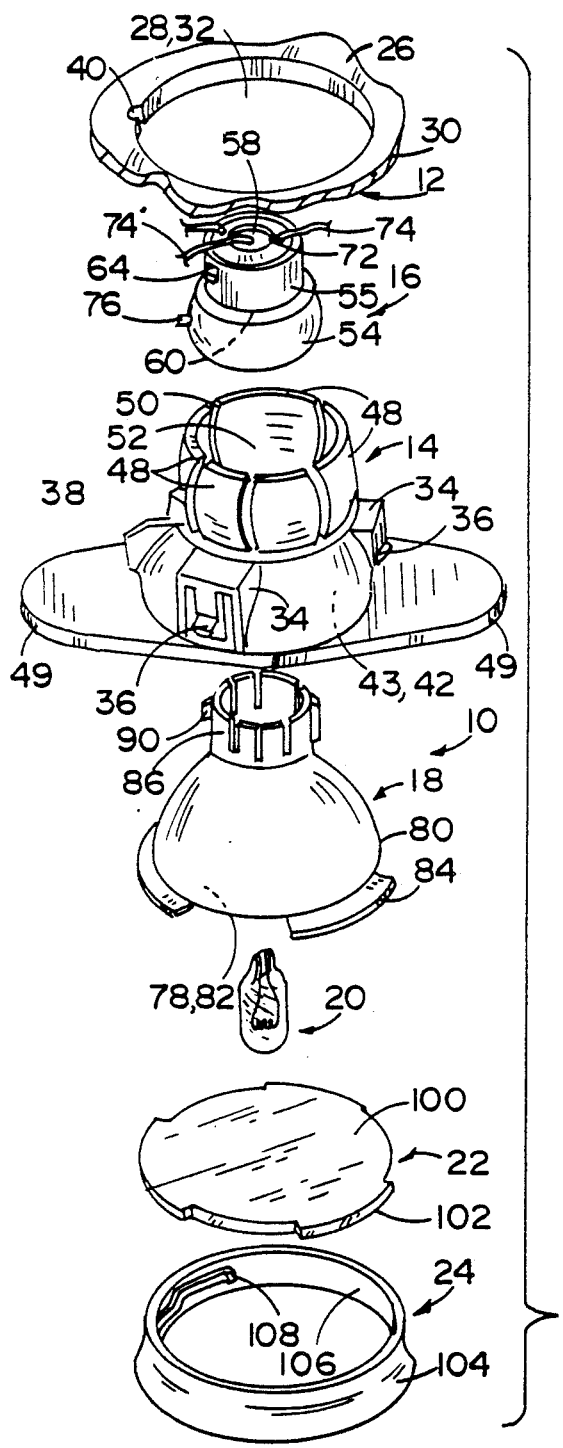
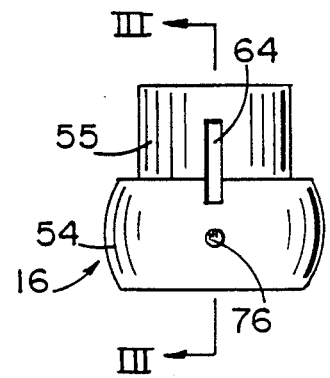
FIG. 2
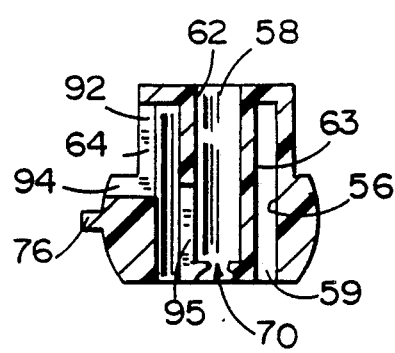
FIG. 3
FIG. 1

OVERHEAD LIGHT

BACKGROUND OF THE INVENTION

The present invention pertains to a courtesy light for use in a vehicle, and particularly to a multipurpose courtesy light for use both for general lighting and as a directionally adjustable spotlight.

Courtesy lights are commonly used in vehicles to provide interior lighting for vehicles such as for entering and exiting a vehicle. These lights are intended to generally light the interior of the vehicle so that a person entering the vehicle can easily see to safely enter the vehicle and also confirm that an intruder is not present in the vehicle. Additional lights ar typically provided to provide a more focused light for reading maps and the like. These additional lights emit a more focused spot-type light which increases light intensity and also prevents the light from spreading around the vehicle interior thus reducing a driver's ability to see out of the vehicle. In order to accommodate both requirements, two different systems of lighting are generally employed. This is both inefficient and costly. U.S. Pat. No. 4,686,609 issued on Aug. 11, 1987, and assigned to the present assignee, discloses a dual light system used to provide both a spotlight and a floodlight by selectively sliding a lens in front of an otherwise flood-type light. Although such system provides a desired dual characteristic light, it requires additional space for the sliding storage of the lens when not over the light.

SUMMARY

The apparatus of the present invention provides a courtesy light in a vehicle which has both an unfocused or flood position and a focused or spotlighting position. In the focused position the light can be rotatably tilted thus directing the light in a desired direction. The apparatus includes a carrier which mounts within the vehicle, and a bulb holder and reflector which cooperate within the carrier to provide a source of both unfocused light and tiltable, adjustable focused light. In the preferred embodiment, the bulb holder includes a spherically shaped section and a protruding end that provides means for tilting, extending and retaining the reflector. In the preferred embodiment, the reflector provides a finger grip for pulling the reflector to an extended position and for limiting the angle of tilt attainable.

Such an apparatus provides a compact and efficient dual system of lighting which reduces the complexity and cost of the apparatus. Further, the apparatus offers advantages of convenience and simplicity of assembly and operation. These and other features, objects, and advantages of the present invention will become apparent upon reading the following description thereof together with reference to the accompanying drawings.

BRIEF DESCRIPTION OF THE DRAWINGS

FIG. 1 is a perspective exploded view of the courtesy light of the present invention;

FIG. 2 is a side elevational view of one of the components in FIG. 1;

FIG. 3 is a cross-sectional view taken through section line III—III in FIG. 2;

DETAILED DESCRIPTION OF THE PREFERRED EMBODIMENT

Figure 4:
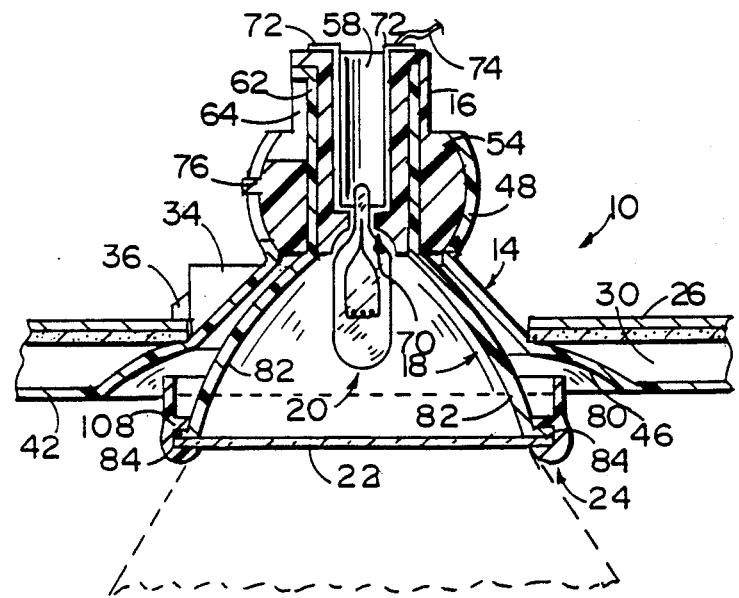
FIG. 4 is an enlarged vertical cross-sectional view of the apparatus of FIG. 1 fully assembled and shown in a first position for providing floodlighting.

Referring initially to FIGS. 1 and 4, there is shown a courtesy light 10 embodying the present invention which is particularly adapted for mounting within the interior passenger compartment of a vehicle such as an automobile. In the preferred embodiment, courtesy light 10 is designed to fit into a roof or wall panel such as header 12 and extend downwardly slightly into the passenger compartment of the vehicle, although it could be used in other areas of the vehicle. In the preferred embodiment, courtesy light 10 comprises a carrier 14, a swivel bulb holder 16 which mounts within the carrier 14 and swivels or tilts therein a reflector 18 which mounts through carrier 14 into bulb holder 16, a bulb 20, a lens 22 and a lens holder bezel 24 which provides a finger grip for extension and movement of the reflector.

Courtesy light 10 (FIGS. 1 and 4) is secured to the under surface of sheet metal roof 26 of the vehicle by insertion of courtesy light 10 into an aperture 28 in headliner 30 and an aligned aperture 32 in the sheet metal 26. Carrier 14 is provided with standoffs 34 which align carrier 14 within holes 28 and 32. Staggered tangs 36 positioned around carrier 14 elastically deform inwardly as carrier 14 is pushed upwardly into place in the roof and then spring outwardly into position gripping the top surface of sheet metal roof 26 for holding carrier 14 in place in the roof. An indexing rib 38 rotationally locates and locks carrier 14 by engaging a notch 40 at the edge of mounting aperture 28 in the sheet metal 26. In the installed position, a generally elliptical peripheral flange 42, integrally formed on carrier 14, engages the lower surface of headliner 30 and together with tangs 36 hold carrier 14 firmly in place. The downwardly opening face 43 of carrier 14 is generally cup-shaped with a central opening 46 (FIG. 4) for receiving the reflector 18.

Carrier 14 also integrally includes upwardly extending curved fingers 48 defining a socket for receiving the bulb holder 16. Fingers 48 are defined in part by slots 50 and have an inside surface 52 which is spherically shaped allowing fingers 48 to mateably receive and retain swivel bulb holder 16. Flange 42 includes a decorative outer surface facing the interior of the vehicle, and the ends of the elliptical flange provide protection for the headliner 30 when the light position is changed as described below. Carrier 14, as well as the remaining elements of the light assembly, is integrally molded of a suitable polymeric material such as polycarbonate.

Figure 5:
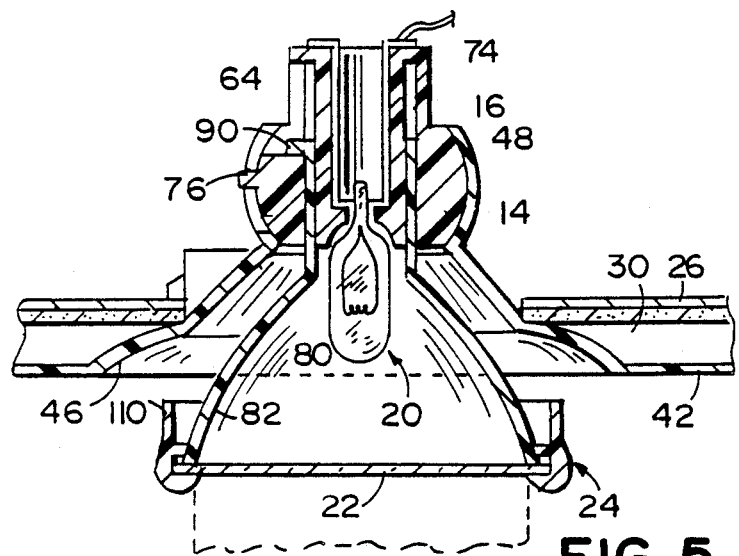
FIG. 5 is a vertical cross-sectional view of the apparatus of FIG. 4 shown in a second position for providing spotlighting.
Figure 6:
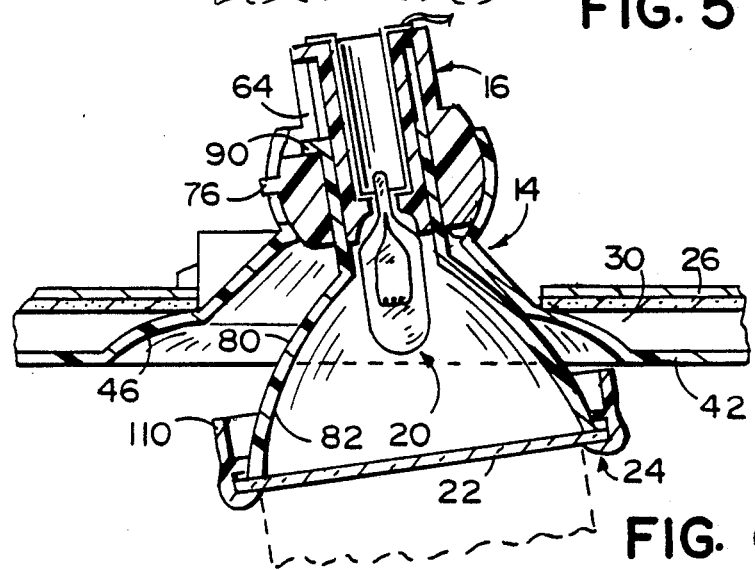
FIG. 6 is a vertical cross-sectional view of the apparatus of FIG. 5 shown in the second position and tilted.

Swivel bulb holder 16 (best shown in FIGS. 2-3) includes a curved central ring 54, an upwardly projecting external collar portion 55, and an internal downwardly extending collar 62. Collar 62 is located centrally within portion 55 and has a generally hollow cylindrical opening 58 and terminates at the bottom in an integrally formed bulb socket 70. The outside surface 63 of collar 62 and the inside surface 56 of ring 54 are spaced to define an annular space 59 (FIG. 3) designed to slidingly receive the cylindrically shaped mating end 86 of reflector 18 as best seen in FIGS. 4-6 and as described below. A vertically extending slot 64 is formed laterally outwardly through the ring and collar 54 and 55, respectively, and receives a pin 90 of reflector 18 to control the sliding extension of the reflector 18 as described in greater detail below. Also extending outwardly from ring 54 of swivel bulb holder 16 are one or more antirotational pins 76 which permit holder 16 to tilt in multiple directions away from an axis located centrally through carrier 14, but prevent the swivel bulb holder 15 from rotating with respect to the centrally located axis. For such purpose, pins 76 fit between fingers 48 in slots 50 of carrier 14.

The opening 58 located centrally on portion 55 is designed to allow electrical contacts 7 to extend from the upper end of opening 58 to bulb socket 70 and to retain contacts 72 in position (FIG. 4). Electrical conductors 74 connect to contacts 72 at the top of portion 55 and are routed away as desired. Electrical power from the vehicle power supply is selectively applied to a bulb 20 mounted in bulb socket 70 and in contact with contacts 7 through the electrical conductors which may be coupled to suitable courtesy lamp switches in a conventional manner.

Reflector 18 is generally parabolic in shape and is defined by an exterior surface 80, an interior surface 82, locking ledge 84 and upper telescoping end 86. Exterior surface 80 is designed to mateably fit into and be received by the downwardly oriented cup-shaped face 46 of carrier 14. Interior surface 82 is parabolically shaped such that when lighted bulb 20 is positioned at the focal point of reflector 18 as seen in FIGS. 4 and 5, the resulting emanating light is focused to provide spotlighting. Alternatively, when reflector 18 is positioned as seen in FIG. 4., the filament of bulb 20 no longer is located at the focal point of the reflective surface 82 of member 18 and the emanating light takes on a floodlight pattern. The telescoping end 86 of reflector 18 is a hollow cylindrically-shaped structure which mateably fits into swivel bulb holder 1 between curved ring 54 and telescoping collar 62. Telescoping end 86 has a retention pin or tang 90 which mateably fits within slot 64. Tang 90 is properly positioned to snappingly engage retention slot 64 on member 16 such that reflector 18 may be inserted in a fully inserted position wherein tang 90 is positioned at upper end 92 of slot 64, or reflector 18 may be extended downwardly until retention tang 90 mechanically strikes the lower end 94 of slot 90. Collar 62 has a relief or slot 95 to allow tang 90 to slide into position.

Covering the downwardly facing open end of reflector 18 is a lens assembly 22 having a pillow optics lens portion 100 with outwardly extended retention ledges 102 and a retainer bezel and finger grip 24. Ledges 102 are mateably positioned against locking ledges 84 of reflector 18. Lens assembly 22 covers the downwardly opening end 78 of reflector 18, both esthetically closing off the courtesy lamp assembly 10 and also reducing glare by more uniformly dispersing light emanating from bulb 20.

Finger grip 24 is a ring-shaped structure having an exterior surface 104 designed to be esthetically pleasing and functional to the touch and an interior surface 106 having locking ridges 108. Finger grip 24 is designed to receive lens 100 such that retention ledges 102 align with locking ridges 108 and permit grip 24 to be installed on and twisted to lock onto locking ledge 84 of reflector 18. An interior annular surface 110 provides a support surface for holding the lower edges of ledges 102 on lens 100 for holding the lens between member 24 and reflector 18 in a vertically aligned position.

Having described the components of the preferred embodiment, the operation and use of this apparatus should become clear. Initially electrical conductors 74 are soldered or otherwise attached to contacts 72 which extend downwardly to make contact with and receive the male end of bulb 20 as is commonly known in the art. Swivel bulb holder 16 is then inserted into the backside (upper end) of central opening 52 on carrier 14 such that fingers 48 of carrier 14 receive and grip swivel bulb holder 16. As installed, antirotation pins 76 fit mateably between adjacent fingers 48 in slots 50 of carrier 14. Reflector 18 is then inserted into the lower end of carrier 14 with telescoping end 86 inserting mateably onto telescoping collar 62 of swivel bulb holder 16. Bulb 20 is then inserted into bulb socket 70, and lens 100 is then placed within lens holder/finger grip 24, and grip 24 is inserted onto reflector 18 and rotated such that locking ridges 108 lockingly engage locking ledges 84 of reflector 18.

Courtesy light 10 is normally positioned with reflector 18 in a fully inserted upwardly position such that finger grip 24 extends adjacent to and against headliner 30. In this upward inserted position (FIG. 4), courtesy light 10 gives off an unfocused flooded light pattern due to the fact that lighted bulb 20 is not at the focal point of the parabolically-shaped silvered reflective interior surface 82 of reflector 18.

When an operator wishes to focus the light from courtesy light 10, the operator grabs finger grip 24 beside ears 49 of flange 42 and pulls downwardly. This causes reflector 18 to slide downwardly on swivel bulb holder assembly 16 with end 86 of reflector 18 sliding telescopingly downwardly in telescoping collar 62 of swivel bulb holder 16. Reflector 18 slides downwardly until retention tangs 90 strike the lower end 94 of slot 64. In this extended position, the lens assembly 22 no longer lays interferingly adjacent to headliner 30, and reflector exterior surface 80 clears the interior cup-shaped face 46 of carrier 14 such that swivel bulb holder 16 and reflector 18 operate as a unit and may be tilted angularly laterally in any direction. Antirotation pins 76 located on the exterior surface 56 of swivel bulb holder 16 ride up and down within slots 50 between fingers 48 of carrier 14 as bulb holder 16 is pivoted thus preventing rotation and preventing wires 74 from being twistedly broken away from contacts 72.

When the operator is done using the spotlight, the user reverses the above procedure by centering the reflector 18 on carrier 14 and pushing upwardly, thus reinserting reflector 18 into swivel bulb holder 16 on telescoping tower 62. Retention tang 90 exerts sufficient lateral forces to combine with telescoping tower 62 in creating sufficient friction to hold reflector 18 in the uppermost position. Where increased friction is desired, surface imperfections can be added to the sliding surfaces of telescoping tower 62. Other devices commonly known in the art such as springs, detents and the like may be used for urging or holding reflector 18 to a fully inserted, upward position.

Thus, it is seen with the courtesy light of the present invention, a compact, efficient and cost effective lighting system is provided for a vehicle. The courtesy light provides both a focused and unfocused position, the focused position offering the ability to direct a focused spotlight in a desired direction. In the preferred embodiment, the bulb holder, reflector and carrier cooperate to provide a means for retaining the parts in an assembly, for extending a portion of the assembly, and for tilting a portion of the assembly such that the direction of the spotlight is controllable. In the preferred embodiment, the reflector provides a finger grip for pulling the reflector to an extended position and for limiting the angle of tilt.

It will become apparent to those skilled in the art that various modifications to the preferred embodiment can be made without departing from the spirit and scope thereof as defined by the appended claims.

The embodiments of the invention in which an exclusive property or privilege is claimed are defined as follows:

1. A light assembly with multiple positions for providing a directionally adjustable spotlight and a floodlight for the interior of a vehicle comprising:
   a carrier including a first retention means for holding said carrier in a vehicle, said carrier having a central opening and further including a second retention means for holding a bulb holder in said opening;
   a bulb holder positioned within said opening of said carrier and shaped to cooperate with said second retention means to allow said bulb holder to tilt in multiple directions, and further including receiving means for telescopingly receiving a reflector;
   a light bulb operably mounted in said bulb holder;
   means for supplying operating power to said light bulb;
   a reflector extending into said carrier and telescopingly mounted to said telescoping receiving means of said bulb holder, said reflector telescopingly moveable on said bulb holder for movement between at least first and second positions, said reflector shaped to reflect light from said light bulb in a floodlight manner when in said first position and in a focused spotlight manner when in said second position.

2. The apparatus as defined in claim 1 wherein said reflector includes means engaging said carrier to prevent tilting when in said first position and clearing said carrier to allow tilting when in said second position such that said reflector and said bulb holder are tiltable as a unit when in said second position.

3. The apparatus as defined in claim 1 wherein said first retention means includes resilient tangs adapted to snap into an aperture for holding said carrier in an aperture in said vehicle.

4. The apparatus as defined in claim 1 and further including means to prevent rotation of said bulb holder about the axis of said opening in said carrier.

5. The apparatus as defined in claim 4 wherein said bulb holder includes a curvilinear outer surface and said second retention means includes curvilinear fingers which mateably receive said bulb holder.

6. The apparatus as defined in claim 5 wherein said means to prevent rotation of said bulb holder includes at least one laterally extending pin which cooperates with said curvilinear fingers to prevent rotation of said bulb holder with respect to said carrier about the longitudinal axis of said carrier.

7. The apparatus as defined in claim 1 and further including means to prevent rotation of said bulb holder in said carrier which includes at least one laterally extending pin which cooperates with said second retention means for preventing rotation of said bulb holder with respect to said carrier about the axis of said carrier.

8. The apparatus as defined in claim 1 wherein said reflector and said bulb holder each include one of a tab and opening which cooperate to snappingly retain said reflector in said bulb holder.

9. The apparatus as defined in claim 1 and further including a lens assembly including means which provides a grip for an operator to pull said reflector from said first position to said second position.

10. The apparatus as defined in claim 9 wherein said lens assembly includes a lens to assist in focusing said light and reducing glare.

11. The apparatus of claim 10 wherein said lens assembly prevents tilting of said reflector when in said first position.

12. The apparatus of claim 11 wherein said carrier, said reflector and said bulb holder snap together for assembly.

13. A dual function light assembly for a vehicle for selectively providing spotlighting or floodlighting comprising:
   a carrier for mounting to a vehicle, said carrier including a resilient generally spherical socket and a downwardly and outwardly extending flange;
   a bulb holder including ring means for mounting said bulb holder within said socket of said carrier to allow said bulb holder to swivel with respect to said carrier;
   a light bulb operably mounted in said bulb holder; and a reflector with means for telescopingly mounting said reflector to said bulb holder such that said reflector can be moved between a first position in which light from said light bulb emanates from said reflector in a diffuse pattern and a second position in which light from said light bulb is focused in a spotlight pattern and wherein in said second position said reflector and said bulb holder are tiltable as a unit to direct light therefrom.

14. The apparatus as defined in claim 13 wherein said carrier includes a mounting flange at an end remote from said socket and resilient mounting tangs spaced from said flange for mounting said carrier within an aperture formed in a vehicle.

15. The apparatus as defined in claim 14 wherein said bulb holder includes a longitudinally extending slot and said reflector includes a pin which extends into said slot to guidably support and limit the telescopic motion of said reflector with respect to said bulb holder.

16. The apparatus as defined in claim 15 wherein said socket is defined by a plurality of curved arms having slots formed therebetween.

17. The apparatus as defined in claim 16 wherein said bulb holder includes at least one pin which extends into one of said slots between said arms to prevent rotation of said bulb holder about the longitudinal axis of said carrier.

18. The apparatus as defined in claim 17 and further including a lens assembly mounted to said reflector at an end remote from said bulb holder.

19. The apparatus as defined in claim 18 wherein said lens assembly includes a lens and a retainer ring for holding said lens on said reflector and which also serves as a finger grip for moving said reflector and bulb holder with respect to said carrier.

20. A dual function light assembly for a vehicle for selectively providing spotlighting or floodlighting comprising:
   a carrier fixedly mounted to a vehicle, said carrier including a socket for pivotally receiving a bulb holder and a downwardly and outwardly extending flange;
a bulb holder including means for mounting said bulb holder within said socket of said carrier to allow said bulb holder to swivel with respect to said carrier;
a light bulb mounted in said bulb holder; and
a parabolic reflector mounted to said bulb holder such that said reflector can be translated with respect to said bulb holder to position the light bulb at the focal point of said reflector or at a location spaced from said focal point such that light from said light bulb emanates from said reflector in either a focused or a diffuse pattern respectively and wherein when said light bulb is in said focal point said reflector and said bulb holder can be swiveled with respect to said carrier to direct light therefrom.

* * * * *